(12) United States Patent
Ohnishi et al.

(10) Patent No.: US 9,522,664 B2
(45) Date of Patent: Dec. 20, 2016

(54) ELECTRIC BRAKE ACTUATOR, AND VEHICLE BRAKE SYSTEM

(75) Inventors: Takaaki Ohnishi, Saitama (JP); Kazuaki Murayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 348 days.

(21) Appl. No.: 13/885,769

(22) PCT Filed: Nov. 17, 2011

(86) PCT No.: PCT/JP2011/076539
§ 371 (c)(1),
(2), (4) Date: May 16, 2013

(87) PCT Pub. No.: WO2012/067191
PCT Pub. Date: May 24, 2012

(65) Prior Publication Data
US 2013/0232965 A1 Sep. 12, 2013

(30) Foreign Application Priority Data

Nov. 17, 2010 (JP) ................ 2010-256362

(51) Int. Cl.
*B60T 11/26* (2006.01)
*B60T 13/74* (2006.01)
(Continued)

(52) U.S. Cl.
CPC ............ *B60T 13/745* (2013.01); *B60T 8/3685* (2013.01); *B60T 8/4081* (2013.01); *B60T 11/22* (2013.01); *B60T 11/26* (2013.01); *B60T 13/662* (2013.01)

(58) Field of Classification Search
CPC ......... B60T 13/745; B60T 7/042; B60T 11/26; B60T 11/22; B60T 17/06; B60T 8/4081; B60T 8/3685
See application file for complete search history.

(56) References Cited

U.S. PATENT DOCUMENTS 4,898,430 A * 2/1990 Becker-Endrigkeit et al. ............................ 303/84.2
5,713,640 A * 2/1998 Feigel .................. B60T 13/745 60/545

(Continued)

FOREIGN PATENT DOCUMENTS

DE 40 14 052 A1 11/1991
DE 4327206 A1 * 2/1995

(Continued)

OTHER PUBLICATIONS

DE 10138070 A1—Machine Translation from Google, Anti-lock braking system for motor vehicles with electric drive, Pub date—Feb. 16, 1995.*

(Continued)

*Primary Examiner* — Michael Leslie
(74) *Attorney, Agent, or Firm* — Carrier Blackman & Associates, P.C.; Joseph P. Carrier; William D. Blackman

(57) ABSTRACT

An electric brake actuator provided with a main reservoir attached to a vehicle frame, a first reservoir attached to an input device and coupled to the main reservoir via a pipe, and a second reservoir coupled to the main reservoir via another pipe and directly mounted to a motor cylinder, wherein the second reservoir is disposed below the main reservoir in the vertical up and down direction.

8 Claims, 7 Drawing Sheets

(51) Int. Cl.
*B60T 8/36* (2006.01)
*B60T 8/40* (2006.01)
*B60T 11/22* (2006.01)
*B60T 13/66* (2006.01)

(56) References Cited

U.S. PATENT DOCUMENTS

| | | | | |
|---|---|---|---|---|
| 5,743,093 | A * | 4/1998 | Nakayoku et al. | 60/585 |
| 5,836,659 | A * | 11/1998 | Feigel et al. | 303/115.2 |
| 6,494,546 | B1 * | 12/2002 | Feigel | 303/113.4 |
| 6,550,591 | B2 * | 4/2003 | Honda | 188/352 |
| 6,808,238 | B2 * | 10/2004 | Drott et al. | 303/114.1 |
| 6,840,044 | B2 * | 1/2005 | Leboisne | 60/585 |
| 7,010,913 | B2 * | 3/2006 | L'Aot et al. | 60/585 |
| 7,441,408 | B2 * | 10/2008 | Bourlon et al. | 60/585 |
| 8,010,269 | B2 * | 8/2011 | Toyohira | B60T 8/4081 188/156 |
| 8,701,407 | B2 * | 4/2014 | Bae et al. | 60/547.1 |
| 2002/0063026 | A1 | 5/2002 | Honda | |
| 2003/0038541 | A1 | 2/2003 | Suzuki et al. | |
| 2010/0231031 | A1 * | 9/2010 | Takahashi et al. | 303/5 |
| 2012/0062023 | A1 | 3/2012 | Ohkubo et al. | |

FOREIGN PATENT DOCUMENTS

| | | |
|---|---|---|
| EP | 1 870 305 A1 | 12/2007 |
| JP | H06-183330 A | 7/1994 |
| JP | 95/05299 A1 | 2/1995 |
| JP | 10-059162 A | 3/1998 |
| JP | 2002-160624 A | 6/2002 |
| JP | 2003-154928 A | 5/2003 |
| JP | 2005-206038 A | 8/2005 |
| JP | 2008-007060 A | 1/2008 |
| JP | 2008-007061 A | 1/2008 |
| JP | 2010-023594 A | 2/2010 |
| WO | 99/17967 A1 | 4/1999 |
| WO | 2010/119889 A1 | 10/2010 |

OTHER PUBLICATIONS

Extended European Search Report dated Mar. 31, 2014 in the counterpart EP Patent Application 11 841 777.3.
First Office Action of Nov. 3, 2014 issued in the counterpart Chinese application 201180055204.X.
Japanese Office Action (Notice of Reasons for Rejection) of Sep. 16, 2014 issued to the counterpart JP Patent Application 2012-544299.

* cited by examiner

ELECTRIC BRAKE ACTUATOR, AND VEHICLE BRAKE SYSTEM

TECHNICAL FIELD

The present invention relates to an electric brake actuator built in a vehicle brake system, and the vehicle brake system.

BACKGROUND ART

Conventionally, booster devices, such as a negative pressure booster and a hydraulic pressure booster, are known as automobile brake mechanisms. As a booster device of this kind, an electric booster device utilizing an electric motor as a booster source is disclosed recently (see, for example, Patent Document 1).

The electric booster device disclosed in Patent Document 1 is structured as a single unit including a main piston reciprocated in accordance with an operation given to a brake pedal, a cylindrical booster piston fitted outwardly so as to be displaceable relatively to the main piston, and an electric motor which reciprocates the booster piston.

In this case, respective front end portions of the main piston and the booster piston as pistons of a master cylinder are in communication with a pressure chamber of the master cylinder. Brake fluid pressure is produced in the master cylinder by input thrust force applied from the brake pedal to the main piston, and by booster thrust force applied from the electric motor to the booster piston.

PRIOR ART DOCUMENTS

Patent Literatures

Patent Document 1: JP 2010-23594 A

DISCLOSURE OF INVENTION

Problems to be Solved by the Invention

However, the electric booster device disclosed in Patent Document 1 has a tendency that the whole device becomes large in size and lacks a general versatility when mass-produced.

The present invention has been made in view of the above-explained disadvantage, and it is an object of the present invention to provide an electric brake actuator and a vehicle brake system which are capable of downsizing the whole device to improve a general versatility.

Means for Solving the Problems

To accomplish the above object, an aspect of the present invention provides an electric brake actuator built in a vehicle brake system, comprising: an input device that comprises a master cylinder into which a brake operation given by an operator is input, and a first reservoir which reserves a brake fluid in the master cylinder; and the electric brake actuator which produces brake fluid pressure using a brake fluid reserved in a second reservoir separate from the first reservoir based on an electric signal in accordance with at least the brake operation. The second reservoir is directly attached to a main body of the electric brake actuator.

According to the present invention, since the second reservoir is directly attached to the main body of the electric brake actuator, the whole device can be downsized. Moreover, since the electric brake actuator which produces brake fluid pressure based on an electric signal in accordance with at least the brake operation itself is provided with the second reservoir, a necessary and sufficient brake fluid in the electric brake actuator can be ensured, and thus the general versatility is improved.

According to the present invention, the electric brake actuator is provided with a main reservoir attached to a vehicle body frame, the first reservoir attached to the input device and connected with the main reservoir via a piping, and the second reservoir connected with the main reservoir via another piping and provided on the electric brake actuator. Hence, a necessary and sufficient brake fluid in the input device and the electric brake actuator can be surely ensured.

In this case, the second reservoir is disposed below the main reservoir in the vertical up-and-down direction, and thus the brake fluid supplied to the main reservoir can be filled in the second reservoir smoothly due to the own weight of the brake fluid.

According to the present invention, an integral first reservoir having the first reservoir attached to the input device and the main reservoir both integrated together is attached to the input device, and the second reservoir of the electric brake actuator is connected with the integral first reservoir via the other piping. Hence, the number of components can be reduced.

In this case, the second reservoir is disposed below the integral first reservoir in the vertical up-and-down direction, and thus the brake fluid supplied to the integral first reservoir can be filled in the second reservoir smoothly due to the own weight of the brake fluid. It is preferable that the volume of the brake fluid reserved in the integral first reservoir should be set to be larger than the volume of the brake fluid reserved in the second reservoir.

According to the present invention, the electric brake actuator main body is provided with an electric motor, and the second reservoir in communication with an interior of the electric brake actuator main body via a reservoir port is formed so as to protrude toward an opposite side to the electric motor with reference to the reservoir port. Accordingly, the spatial efficiency is improved, thereby accomplishing the downsizing of the whole device.

According to the present invention, the second reservoir is provided with a connection port connected with the reservoir port provided in the electric brake actuator main body, and the connection port of the second reservoir is connected to the reservoir port of the electric brake actuator main body from a side where the electric motor is disposed.

Another aspect of the present invention provides a vehicle brake system that includes: an input device into which a brake operation given by an operator is input; and an electric brake actuator which produces brake fluid pressure based on an electric signal in accordance with at least the brake operation. A reservoir for reserving a brake fluid is directly attached to a main body of the electric brake actuator.

According to the present invention, a vehicle brake system can be obtained which can downsize the whole device to improve the general versatility.

Effect of the Invention

According to the present invention, the electric brake actuator and the vehicle brake system which are capable of downsizing the whole device to improve a general versatility can be obtained.

BEST MODE FOR CARRYING OUT THE INVENTION

Figure 1:
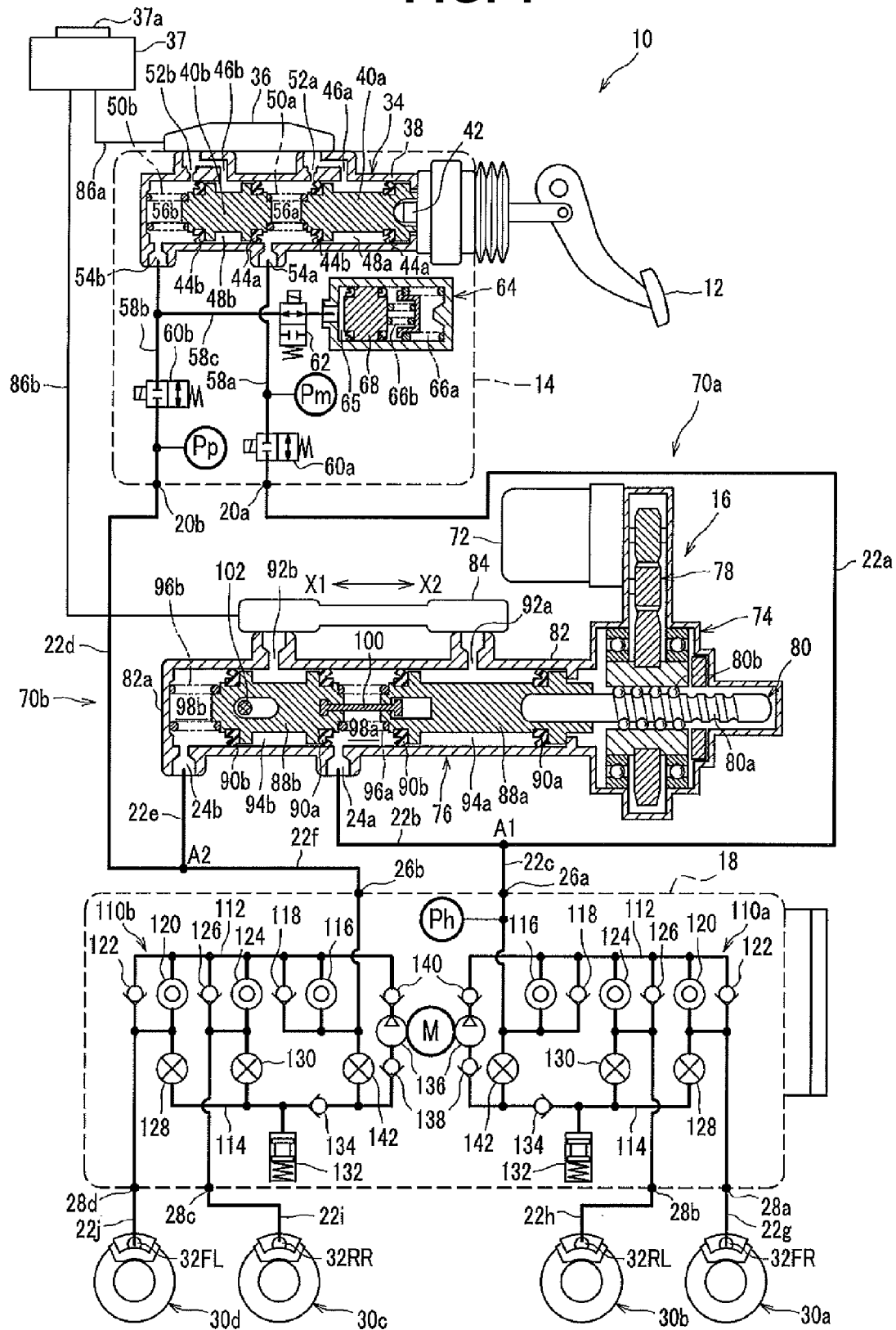
FIG. 1 is a schematic diagram illustrating a structure of a vehicle brake system built with a motor cylinder device according to an embodiment of the present invention.

Next, an embodiment of the present invention will be explained in detail with reference to the drawings as needed. FIG. 1 is a schematic diagram illustrating a vehicle brake system built with a motor cylinder device according to an embodiment of the present invention.

A vehicle brake system 10 illustrated in FIG. 1 includes both of a by-wire brake system for a normal use which actuates a brake by transmitting an electric signal, and a conventional hydraulic pressure brake system for a fail-safe use which actuates a brake by transmitting hydraulic pressure.

Hence, as illustrated in FIG. 1, the vehicle brake system 10 basically includes, as separate units, an input device 14 into which an operation given when an operator operates a brake pedal 12, a motor cylinder device (electric brake actuator) 16 which controls (produces) brake fluid pressure, and a vehicle stability assist device (vehicle behavior stabilizing device) 18 (hereinafter, referred to as a VSA device 18, VSA: registered trademark) assisting stabilization of vehicle behavior.

Those input device 14, motor cylinder device 16 and VSA device 18 are connected together through, for example, fluid pressure lines that are formed of pipe members, such as a hose or a tube. As the by-wire brake system, the input device 14 and the motor cylinder device 16 are electrically connected via an unillustrated harness.

An explanation will be given of the fluid pressure lines, with reference to a coupling point A1 in FIG. 1, a connection port 20a of the input device 14 is connected to the coupling point A1 via a first piping tube 22a. Moreover, an output port 24a of the motor cylinder device 16 is connected to the coupling point A1 via a second piping tube 22b. Furthermore, an inlet port 26a of the VSA device 18 is connected to the coupling point A1 via a third piping tube 22c.

With reference to a coupling point A2 in FIG. 1, another connection port 22b of the input device 14 is connected to the coupling point A2 via a fourth piping tube 22d. Moreover, another output port 24b of the motor cylinder device 16 is connected to the coupling point A2 via a fifth piping tube 22e. Furthermore, another inlet port 26b of the VSA device 18 is connected to the coupling point A2 via a sixth piping tube 22f.

The VSA device 18 is provided with multiple outlet ports 28a to 28d. The first outlet port 28a is connected to, via a seventh piping tube 22g, a wheel cylinder 32FR of a disk brake mechanism 30a provided at a front right wheel. The second outlet port 28b is connected to, via an eighth piping tube 22h, a wheel cylinder 32RL of a disk brake mechanism 30b provided at a rear left wheel. The third outlet port 28c is connected to, via a ninth piping tube 22i, a wheel cylinder 32RR of a disk brake mechanism 30c provided at a rear right wheel. The fourth outlet port 28d is connected to, via a tenth piping tube 22j, a wheel cylinder 32FL of a disk brake mechanism 30d provided at a front left wheel.

In this case, brake fluid is supplied to the respective wheel cylinders 32FR, 32RL, 32RR and 32FL of the disk brake mechanisms 30a to 30d through the piping tubes 22g to 22j connected to the respective outlet ports 28a to 28d. The respective wheel cylinders 32FR, 32RL, 32RR and 32FL are actuated upon an increase of the fluid pressure in the respective wheel cylinders 32FR, 32RL, 32RR, and 32FL, and thus braking force is applied to the corresponding wheels (the front right wheel, the rear left wheel, the rear right wheel and the front left wheel).

The vehicle brake system 10 is provided in a manner mountable on various kinds of vehicles including, for example, an automobile driven by only an engine (internal combustion engine), a hybrid automobile, an electric automobile and a fuel-cell automobile.

The input device 14 includes a tandem master cylinder 34 capable of producing fluid pressure in accordance with an operation given to the brake pedal 12 by a driver (an operator), and a first reservoir 36 attached to the above-explained master cylinder 34. The first reservoir 36 is connected to a main reservoir 37 via a piping tube 86a in such a way that brake fluid supplied to the interior of the main reservoir 37 is reserved in the first reservoir 36 through the piping tube 86a. A cap member 37a is provided on a top surface of the main reservoir 37 which closes an opening that is a brake fluid supply port (see FIG. 2).

Two pistons 40a and 40b are disposed in a freely slidable manner in a cylinder tube 38 of the master cylinder 34 so as to be distant from each other by a predetermined distance along an axial direction of the cylinder tube 38. The one piston 40a is disposed near the brake pedal 12, and is coupled with the brake pedal 12 through a pushrod 42 so as to be operated directly. Another piston 40b is disposed so as to be apart from the brake pedal 12 over the one piston 40a.

A pair of piston packings 40a and 40b are attached to the respective outer peripheries of the one and another pistons 40a and 40b through annular recesses. Back chambers 48a, 48b in communication with supply ports 46a, 46b, respectively, to be discussed later are formed between the pair of piston packings 40a and 40b. A spring member 50a is disposed between the one and another pistons 40a and 40b, and another spring member 50b is disposed between another piston 40b and a side end portion of the cylinder tube 38.

The cylinder tube 38 of the master cylinder 34 is provided with the two supply ports 46a and 46b, two relief ports 52a and 52b and two output ports 54a and 54b. In this case, each supply port 46a (46b) and each relief port 52a (52b) are provided so as to be merged with each other and to be in communication with an unillustrated reservoir chamber in the first reservoir 36.

A first pressure chamber 56a and a second pressure chamber 56b which produce brake fluid pressure in accordance with depress force applied to the brake pedal 12 by the driver are provided in the cylinder tube 38 of the master cylinder 34. The first pressure chamber 56a is provided so as to be in communication with the connection port 20a through a first fluid pressure line 58a. The second pressure chamber 56b is provided so as to be in communication with another connection port 20b through a second fluid pressure line 58b.

A pressure sensor Pm is disposed at an upstream side of the first fluid pressure line 58a and between the master cylinder 34 and the connection port 20a. A first cut-off valve 60a that is a normally-opened solenoid valve is provided at a downstream side of the first fluid pressure line 58a. This pressure sensor Pm detects, over the first fluid pressure line 58a, fluid pressure at the upstream side that is the master-cylinder-34-side over the first cut-off valve 60a.

A second cut-off valve 60b that is a normally-opened solenoid valve is provided at the upstream side of the second fluid pressure line 58b and between the master cylinder 34 and another connection port 20b. A pressure sensor Pp is provided at the downstream side of the second fluid pressure line 58b. This pressure sensor Pp detects, over the second fluid pressure line 58b, fluid pressure at the downstream side that is the wheel-cylinders-32FR,-32RL,-32RR-and-32FL-side of the second cut-off valve 60b.

The term normally-open in these first cut-off valve 60a and second cut-off valve 60b means a valve structured so as to be in a condition in which a normal position (a position of a valve element when not energized) is an open position (usually opened). FIG. 1 illustrates the first cut-off valve 60a and the second cut-off valve 60b in a closed condition in which currents are applied to the respective solenoids and the unillustrated valve elements are actuated.

In the second fluid pressure line 58b between the master cylinder 34 and the second cut-off valve 60b, a branched fluid pressure line 58c is provided which branched from the second fluid pressure line 58b. A third cut-off valve 62 that is a normally-closed (usually closed) solenoid valve and a stroke simulator 64 are connected in series to the branched fluid pressure line 58c. The term normally-closed in the third cut-off valve 62 means a valve structured so as to be in a condition in which a normal position (a position of a valve element when not energized) is a closed position (usually closed). FIG. 1 illustrates the third cut-off valve 62 in an opened condition in which a current is applied to the solenoid and the unillustrated valve element is actuated.

This stroke simulator 64 is a device which produces brake stroke and reaction force at the time of by-wire control, so as to cause the operator to think as if braking force is produced by depressing force. The stroke simulator 64 is disposed over the second fluid pressure line 58b and at the master-cylinder-34-side over the second cut-off valve 60b. The stroke simulator 64 is provided with a fluid pressure chamber 65 which is in communication with the branched fluid pressure line 58c, and is provided so as to be capable of absorbing brake fluid delivered from the second pressure chamber 56b of the master cylinder 34 via the fluid pressure chamber 65.

The stroke simulator 64 includes a first return spring 66a with a higher spring constant and a second return spring 66b with a lower spring constant which are disposed in series with each other, and a simulator piston 68 which is depressed by the first and second return springs 66a and 66b. The stroke simulator 64 is provided so as to cause pedal feeling of the brake pedal 12 to be equivalent to that of the conventional master cylinder by setting the gradient of the increase of pedal reaction force to be low during an early stage of depression of the brake pedal 12, and to be high during a later stage of the depression.

As roughly distinguished, the fluid pressure lines include a first fluid pressure system 70a connecting the first pressure chamber 56a of the master cylinder 34 with the multiple wheel cylinders 32FR, 32RL, and a second fluid pressure system 70b connecting the second pressure chamber 56b of the master cylinder 34 with the multiple wheel cylinders 32RR, 32FL.

The first fluid pressure system 70a includes the first fluid pressure line 58a connecting the output port 54a of the master cylinder 34 (cylinder tube 38) and the connection port 20a in the input device 14, the piping tubes 22a, 22b connecting the connection port 20a of the input device 14 and the output port 24a of the motor cylinder device 16, the piping tubes 22b, 22c connecting the output port 24a of the motor cylinder device 16 and the inlet port 26a of the VSA device 18, and the piping tubes 22g, 22h respectively connecting the outlet ports 28a, 28b of the VSA device 18 with the wheel cylinders 32FR, 32RL.

The second fluid pressure system 70b includes the second fluid pressure line 58b connecting the output port 54b of the master cylinder 34 (cylinder tube 38) and another connection port 20b in the input device 14, the piping tubes 22d, 22e connecting another connection port 20b of the input device 14 and the output port 24b of the motor cylinder device 16, the piping tubes 22e, 22f connecting the output port 24b of the motor cylinder device 16 and the inlet port 26b of the VSA device 18, and the piping tubes 22i, 22j respectively connecting the outlet ports 28c, 28d of the VSA device 18 with the wheel cylinders 32RR, 32FL.

As a result, since the fluid pressure lines are structured by the first fluid pressure system 70a and the second fluid pressure system 70b, the respective wheel cylinders 32FR, 32RL and the respective wheel cylinders 32RR, 32FL can be actuated independently from each other, and mutually independent braking forces can be produced.

The motor cylinder 16 which functions as an electric brake actuator includes an actuator mechanism 74 including an electric motor 72, and a cylinder mechanism 76 depressed by the actuator mechanism 74.

The actuator mechanism 74 includes a gear mechanism (reduction gear mechanism) 78 which is provided at the output-shaft side of the electric motor 72, and which has multiple gears meshed with each other to transmit rotational driving force by the electric motor 72, and a ball screw structure 80 having a ball screw shaft 80a and a ball 80b reciprocated along an axial direction upon transmission of the rotational driving force through the gear system 78.

Figure 2:
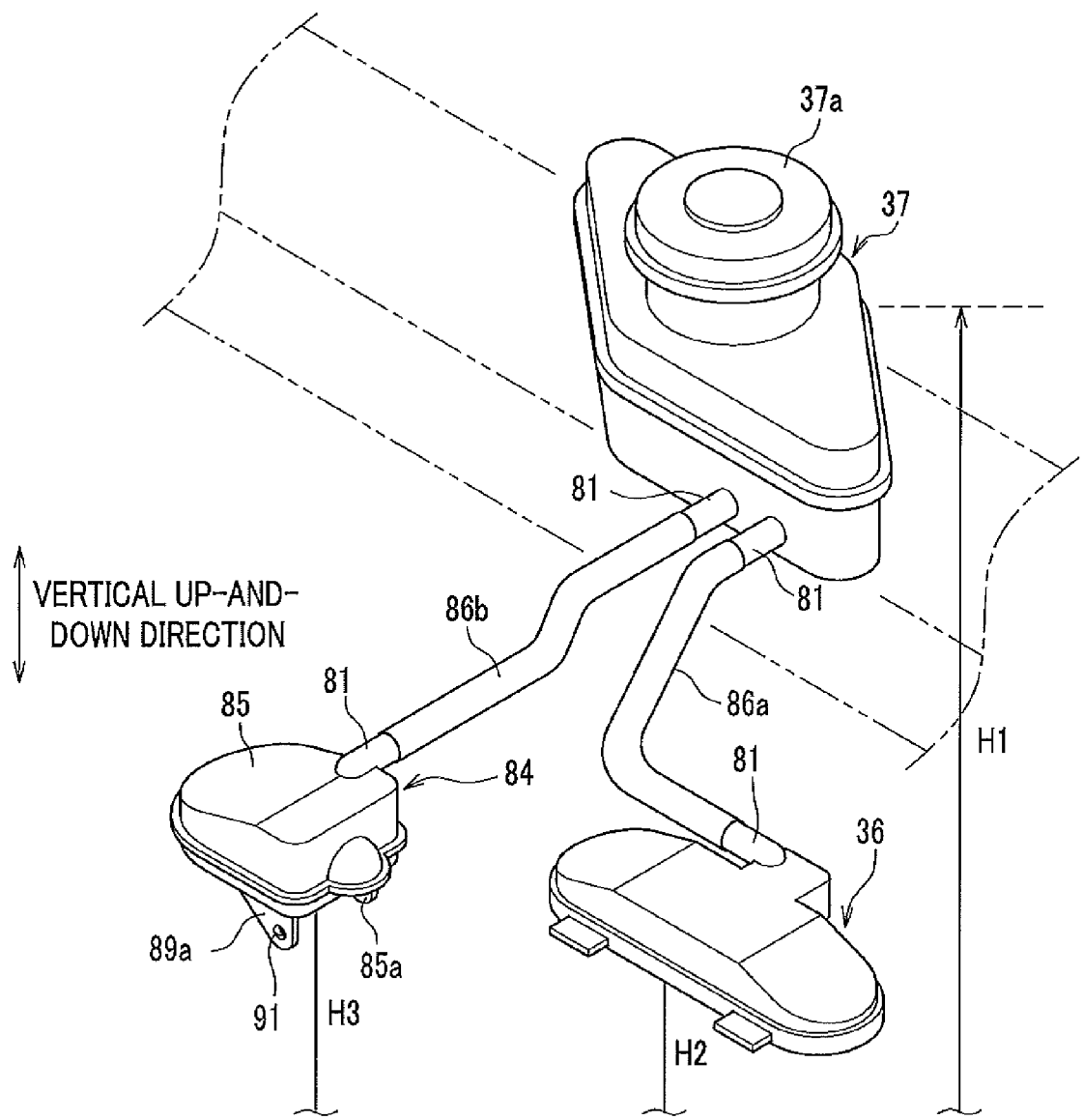
FIG. 2 is a perspective view illustrating a relationship of piping connection among a main reservoir, and first and second reservoirs.
Figure 3:
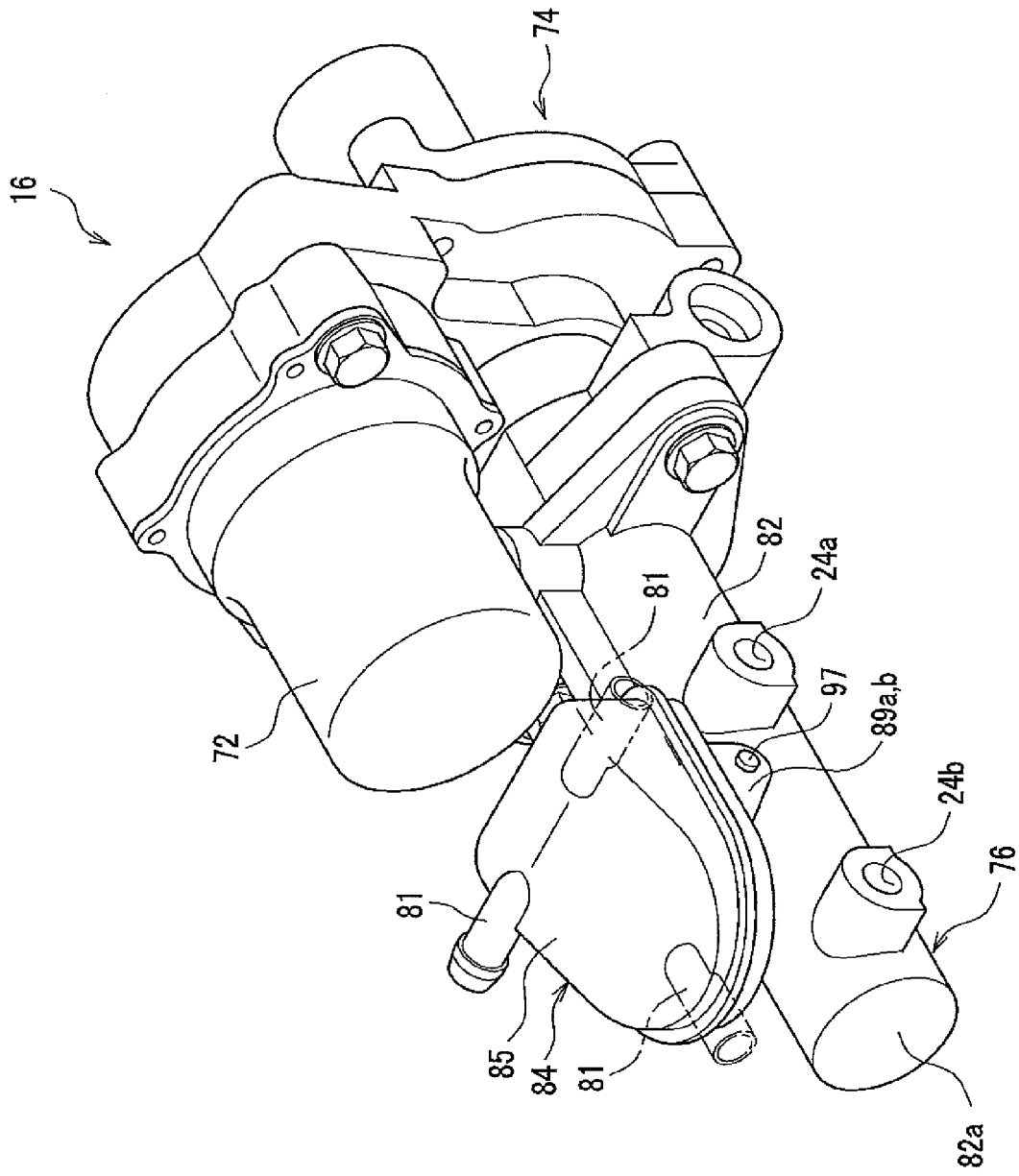
FIG. 3 is a perspective view of the motor cylinder device illustrated in FIG. 1.
Figure 4:
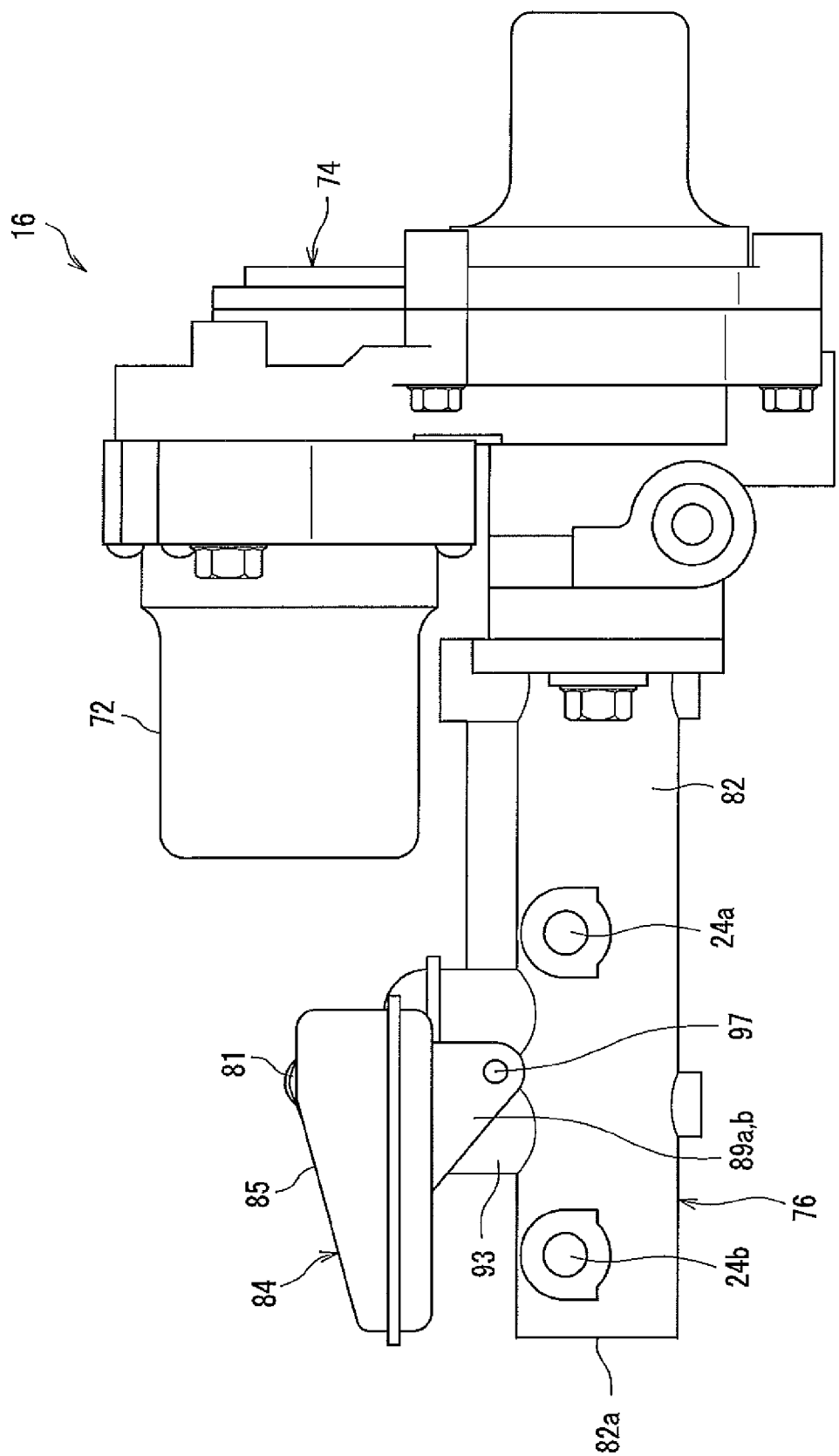
FIG. 4 is a side view of the motor cylinder device.
Figure 5:
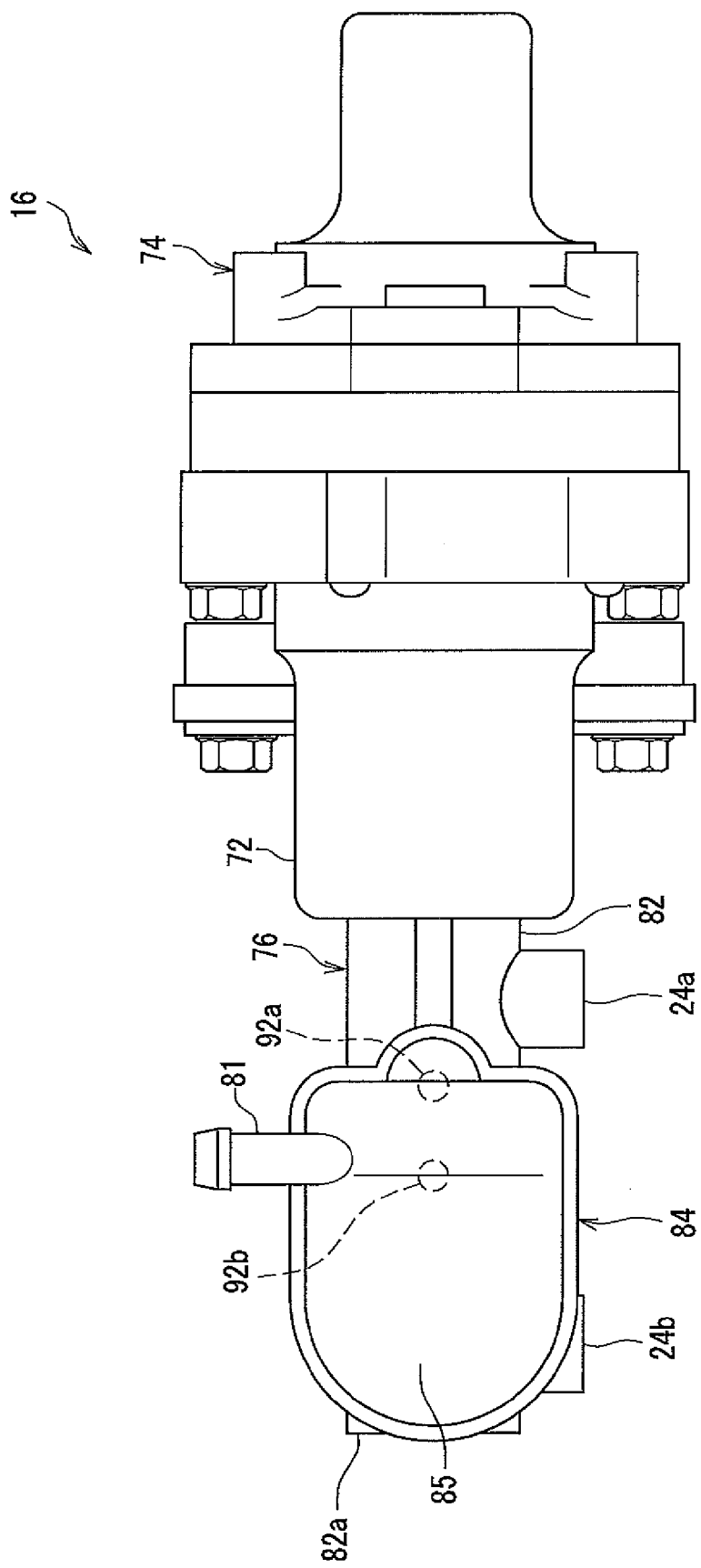
FIG. 5 is a plan view of the motor cylinder device.

FIG. 2 is a perspective view illustrating a relationship of piping connection among a main reservoir, and first and second reservoirs. FIG. 3 is a perspective view of the motor cylinder device illustrated in FIG. 1. FIG. 4 is a side view of the motor cylinder device. FIG. 5 is a top view of the motor cylinder device.

As illustrated in FIG. 3, the cylinder mechanism 76 includes a substantially cylindrical cylinder main body 82, and a second reservoir 84 which is attached directly to the outer circumference of the cylinder main body 82. Since the motor cylinder device 16 has the second reservoir 84 attached directly to the cylinder main body 82, necessary and sufficient amount of brake fluid in the cylinder main body 82 can be ensured.

As illustrated in FIG. 2, the second reservoir 84 is connected to the main reservoir 37 via a piping tube 86b and provided in such a way that brake fluid reserved in the main reservoir 37 is supplied to the second reservoir 84 through the piping tube 86b. As a result, the brake fluid in the second reservoir 84 can be refilled (compensated) with brake fluid from the main reservoir 37, and thus necessary and sufficient amount of brake fluid in the cylinder main body 82 can be surely ensured.

The main reservoir 37 is fastened to a vehicle body frame by, for example, fixing means like an unillustrated bracket. In this case, as illustrated in FIG. 2, a height position H1 of the main reservoir 37 is, in comparison with a height position H2 of the first reservoir 36 attached to the master cylinder 34 (input device 14) and a height position H3 of the second reservoir 84 attached to the cylinder main body 82 (motor cylinder device 16), set to be the highest position in a vertical up-and-down direction (H1 >H2, H3). The setting is made in consideration of a fluid flow in filing of the brake fluid, and the brake fluid which is supplied from the opening of the main reservoir 37 can be filled smoothly to the first reservoir 36 and the second reservoir 84 through the respective piping tubes 86a, 86b due to the own weight of the brake fluid. That is, although the input device 14 and the motor cylinder device 16 are structured as separate units, refilling of the brake fluid can be carried out only to the main reservoir 37.

The height positions will be supplementary explained, and it is appropriate if the second reservoir 84 attached to the motor cylinder device 16 be set at a position lower than the main reservoir 37 in the height relationship in the vertical up-and-down direction (H1>H3). Either the second reservoir 84 or the first reservoir 36 can be higher or lower, and there is no positional relationship in the height direction therebetween.

The main reservoir 37, the first reservoir 36 and the second reservoir 84 are each provided with a nipple 81 which protrudes in a predetermined direction to function as connection port of each piping tube 86a and 86b. In FIG. 3, multiple protruding directions of the nipple 81 provided in the second reservoir 84 are illustrated in virtual lines as examples.

The second reservoir 84 includes a reservoir main body 85, and this reservoir main body 85 is formed so as to protrude from reservoir ports 92a, 92b to be discussed later to an opposite side to the electric-motor-72 side. That is, as illustrated in FIG. 5, in the plan view, the second reservoir 84 and the electric motor 72 are linearly disposed substantially parallel to an axial line of the cylinder main body 82, and the second reservoir 84 is formed so as to protrude by only predetermined length toward a side end portion 82a of the cylinder main body 82 from the reservoir ports 92a, 92b to be discussed later. As explained above, by forming the reservoir main body 85 of the second reservoir 84 so as to protrude toward the opposite side to the electric motor 72, a spatial efficiency near the cylinder main body 82 can be improved, thereby downsizing of the whole device.

Provided on a bottom surface of the reservoir main body 85 are a pair of coupling protruding portions 85a, 85b connected to openings 83, 83 of the cylinder main body 82 (see FIG. 6 to be discussed later). Formed in the pair of coupling protruding portions 85a, 85b are connecting ports 101 which cause the reservoir ports 92a, 92b of the cylinder main body 82 to be in communication with a reservoir chamber in the reservoir main body 85.

Figure 6:
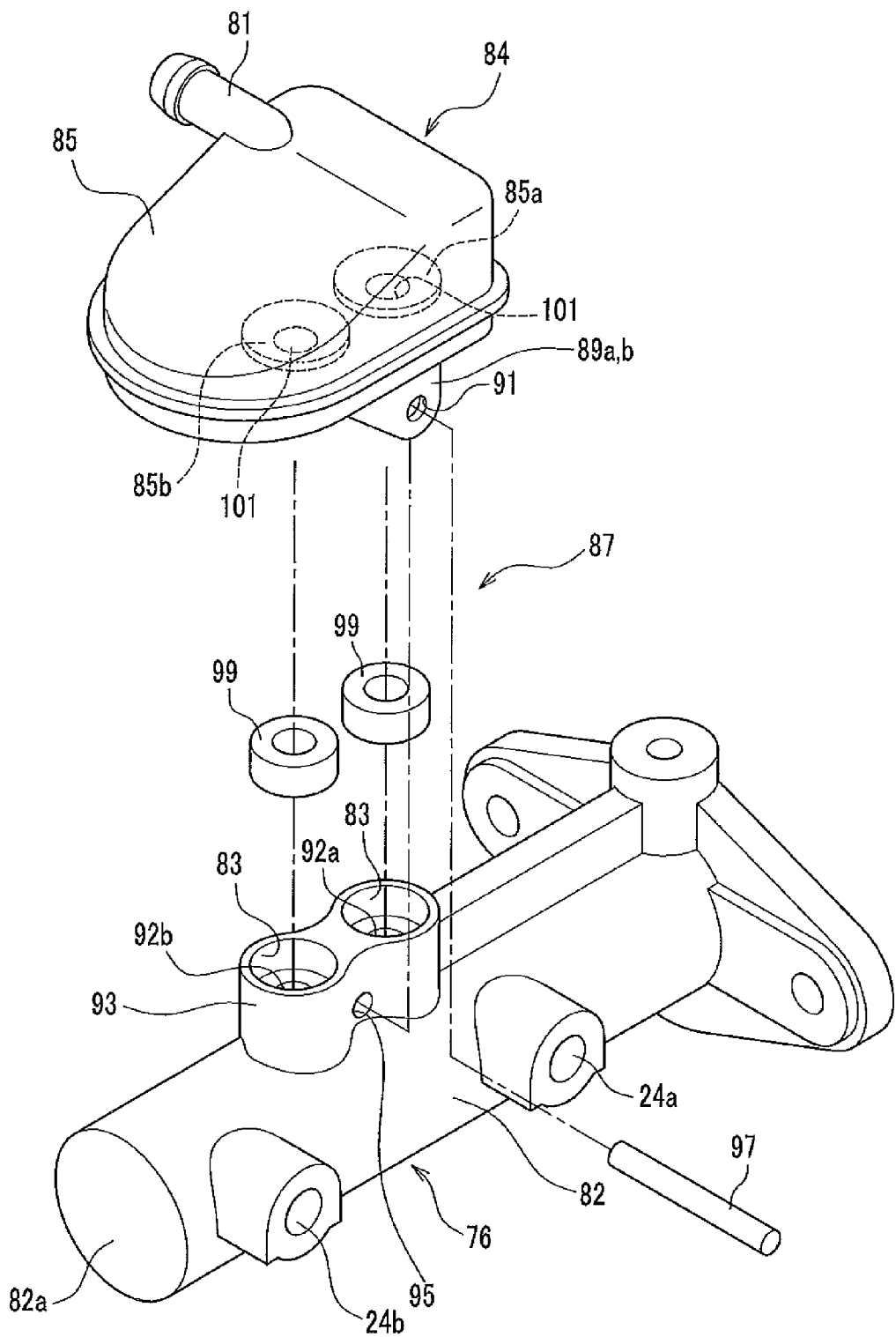
FIG. 6 is an exploded perspective view illustrating an attachment mechanism of attaching the second reservoir to a cylinder main body.

FIG. 6 is an exploded perspective view illustrating an attachment mechanism to attach the second reservoir to the cylinder main body. As illustrated in FIG. 6, the second reservoir 84 is fixed to the outer periphery of the cylinder main body 82 via the attachment mechanism 87. This attachment mechanism 87 includes a pair of attachment protruding portions 89a, 89b which are provided at the lower face of the reservoir main body 85 so as to face with each other and which are generally formed in a triangular shaped (see FIG. 4) in the side view (however, in FIG. 6, the illustration of the attachment protruding portion 89b provided on one side is omitted), and a locking pin 97 penetrating, respectively, through insertion holes 91 formed in the pair of attachment protruding portions 89a, 89b and through a pin insertion hole 95 formed in a projecting part 93 of the cylinder main body 82.

In this case, the second reservoir 84 is assembled to the reservoir ports 92a, 92b from an upper space of the cylinder main body 82 on which the electric motor 72 is disposed. More specifically, first, ring-shaped seal members 99 are respectively put on the pair of openings 83, 83 of the projecting part 93 which are to be in communication with the reservoir ports 92a, 92b of the cylinder main body 82. After the seal members 99 are put on, with the reservoir main body 85 positioned with the reservoir ports 92a, 92b being pressed from the upper space to the downward space, the locking pin 97 is respectively inserted into the insertion holes 91 formed in the pair of attachment protruding portions 89a, 89b and into the pin insertion hole 95 formed in the projecting part 93 of the cylinder main body 82, and thus the second reservoir 84 is assembled with and fixed to the cylinder main body 82.

In this case, since the ring-shaped the seal members 99 are formed of, for example, an elastic material like rubber, reaction force is produced which depresses the coupling protruding portions 85a, 85b of the reservoir main body 85 upwardly when the seal members are compressed and deformed by the coupling protruding portions 85a, 85b abutting the seal members 99. Since the locking pin 97 is inserted in the pin insertion hole 95 with the reservoir main body 85 being pressed against this reaction force by the seal members 99, the second reservoir 84 can be easily fixed to the cylinder main body 82. As a result, the simple attachment and fixation can be enabled without a load applied to the second reservoir 84, and the second reservoir 84 is surely prevented from being detached from the cylinder main body 82.

Returning to FIG. 1, disposed in the cylinder main body 82 are a first sleeve piston 88a and a second sleeve piston 88b in a freely slidable manner which are distant from each other by a predetermined distance along the axial direction of the cylinder main body 82. The first sleeve piston 88a is disposed near a ball-screw-structure-80 side, and abuts one end portion of the ball screw shaft 80a so as to be displaced in a direction of an arrow X1 or X2 together with the ball screw shaft 80a. Moreover, the second sleeve piston 88b is disposed so as to be apart from the ball-screw-structure-80 side over the first sleeve piston 88a.

A pair of sleeve piston packings 90a, 90b are attached to respective outer peripheries of the first and second sleeve pistons 88a, 88b through annular recesses. A first back chamber 94a and a second back chamber 94b in communication with the reservoir ports 92a, 92b, respectively, are formed between the pair of sleeve piston packings 90a, 90b. A first return spring 96a is disposed between the first and second sleeve pistons 88a, 88b, and a second return spring 96b is disposed between the second sleeve piston 88b and the side end portion 82a of the cylinder main body 82.

The cylinder main body 82 of the cylinder mechanism 76 is provided with the two reservoir ports 92a, 92b, and the two output ports 24a, 24b. In this case, the reservoir port 92a (92b) is provided so as to be in communication with an unillustrated reservoir chamber in the second reservoir 84 through the connection port 101 (see FIG. 6).

Provided in the cylinder main body 82 is a first fluid pressure chamber 98a which controls brake fluid pressure output from the output port 24a to the wheel-cylinders-32FR,-32RL side. Moreover, also provided in the cylinder main body 82 is a second pressure chamber 98b which controls brake fluid pressure output from another output port 24b to the wheel-cylinders-32RR,-32FL side.

Provided between the first sleeve piston 88a and the second sleeve piston 88b is a restriction means 100 which restricts the maximum stroke (maximum displacement distance) and minimum stroke (minimum displacement distance) of the first sleeve piston 88*a* and the second sleeve piston 88*b*. Moreover, provided in the second sleeve piston 88*b* is a stopper pin 102 which restricts a slidable range of the second sleeve piston 88*b* to suppress an over-return toward the first sleeve piston 88*a*. The restriction means 100 and the stopper pin 102 suppress a breakdown of one system when the other system breaks down, in particular, in the backup operation for performing braking with brake fluid produced by the master cylinder 34.

The VSA device 18 is conventionally known, and includes a first brake system 110*a* which controls the first fluid pressure system 70*a* connected to the disk brake mechanisms 30*a*, 30*b* (the wheel cylinder 32FR and the wheel cylinder 32RL) of the front right wheel and the rear left wheel. Moreover, the VSA device 18 includes a second brake system 110*b* which controls the second fluid pressure system 70*b* connected to the disk brake mechanisms 30*c*, 30*d* (the wheel cylinder 32RR and the wheel cylinder 32FL) of the rear right wheel and the front left wheel. The first brake system 110*a* may be a fluid pressure system connected to the disk brake mechanisms which are provided at the front left wheel and the front right wheel, and the second brake system 110*b* may be a fluid pressure system connected to the disk brake mechanisms which are provided at the rear left wheel and the rear right wheel. The first brake system 110*a* may be a fluid pressure system connected to the disk brake mechanisms which are provided at the front right wheel and the rear right wheel on one side of a vehicle body, and the second brake system 110*b* may be a fluid pressure system connected to the disk brake mechanisms which are provided at the front left wheel and the rear left wheel on one side of the vehicle body.

Since these first brake system 110*a* and second brake system 110*b* employ the same structure, corresponding components between the first brake system 110*a* and the second brake system 110*b* will be denoted by the same referential symbol. The explanation will be mainly given of the first brake system 110*a* and the explanation for the second brake system 110*b* will be noted in parentheses.

The first brake system 110*a* (the second brake system 110*b*) includes a first common fluid pressure line 112 and a second common fluid pressure line 114 which are common to the wheel cylinders 32FR, 32RL (the wheel cylinders 32RR, 32FL). The VSA device 18 includes a regulator valve 116 that is a normally-opened solenoid valve disposed between the inlet port 26*a* and the first common fluid pressure line 112, a first check valve 118 which is disposed in parallel with the regulator valve 116 and allows brake fluid to flow from the inlet-port-26*a* side to the first-common-fluid-pressure-line-112 side (prevents the brake fluid from flowing from the first-common-fluid-pressure-line-112 side to the inlet-port-26*a* side), and a first in-valve 120 that is a normally-opened solenoid valve disposed between the first common fluid pressure line 112 and the first outlet port 28*a*. Moreover, the VSA device 18 includes a second check valve 122 which is disposed in parallel with the first in-valve 120 and allows brake fluid to flow from the first-outlet-port-28*a* side to the first-common-fluid-pressure-line-112 side (prevents the brake fluid from flowing from the first-common-fluid-pressure-line-112 side to the first-outlet-port-28*a* side), a second in-valve 124 that is a normally-opened solenoid valve disposed between the first common fluid pressure line 112 and the second outlet port 28*b*, and a third check valve 126 which is disposed in parallel with the second in-valve 124 and allows brake fluid to flow from the second-outlet-port-28*b* side to the first-common-fluid-pressure-line-112 side (prevents the brake fluid from flowing from the first-common-fluid-pressure-line-112 side to the second-outlet-port-28*b* side).

Furthermore, the VSA device 18 includes a first out-valve 128 that is a normally-closed solenoid valve disposed between the first outlet port 28*a* and the second common fluid pressure line 114, a second out-valve 130 that is a normally-closed solenoid valve disposed between the second outlet port 28*b* and the second common fluid pressure line 114, a reservoir 132 connected to the second common fluid pressure line 114, a fourth check valve 134 which is disposed between the first common fluid pressure line 112 and the second common fluid pressure line 114 and allows brake fluid to flow from the second-common-fluid-pressure-line-114 side to the first-common-fluid-pressure-line-112 side (prevents the brake fluid from flowing from the first-common-fluid-pressure-line-112 side to the second-common-fluid-pressure-line-114 side), a pump 136 which is disposed between the fourth check valve 134 and the first common fluid pressure line 112 and supplies brake fluid from the second-common-fluid-pressure-line-114 side to the first-common-fluid-pressure-line-112 side, an inlet valve 138 and an outlet valve 140 which are provided ahead of and behind of the pump 136, a motor M which actuates the pump 136, and a suction valve 142 disposed between the second common fluid pressure line 114 and the inlet port 26*a*.

In the first brake system 110*a*, provided over the fluid pressure line near the inlet port 26*a* is a pressure sensor Ph that detects brake fluid pressure which is output from the output port 24*a* of the motor cylinder device 16 and which is controlled in the first pressure chamber 98*a* of the motor cylinder device 16. Detection signals detected by the respective pressure sensors Pm, Pp, and Ph are input to unillustrated control means. The VSA device 18 performs VSA control, and also ABS control.

The vehicle brake system 10 built with the motor cylinder device 16 according to the present embodiment is basically structured as explained above, and an action and an effect will be explained next.

In a normal condition in which the vehicle brake system 10 functions normally, the first cut-off valve 60*a* and the second cut-off valve 60*b* which are normally-opened solenoid valves become a closed condition by being excited upon application of currents, and the third cut-off valve 62 which is a normally-closed solenoid valve becomes an opened condition by being excited upon application of a current (see FIG. 1). Hence, the first fluid pressure system 70*a* and the second fluid pressure system 70*b* are blocked by the first cut-off valve 60*a* and the second cut-off valve 60*b*, and thus no brake fluid pressure produced in the master cylinder 34 of the input device 14 is transmitted to the wheel cylinders 32FR, 32RL, 32RR, 32FL of the disk brake mechanisms 30*a* to 30*d*.

At this time, brake fluid pressure produced in the second pressure chamber 56*b* of the master cylinder 34 is transmitted to the fluid pressure chamber 65 of the stroke simulator 64 via the branched fluid pressure line 58*c* and the third cut-off valve 62 which is in an opened condition. Since the simulator piston 68 is displaced against spring force of the spring members 66*a*, 66*b* by the brake fluid pressure supplied to this pressure chamber 65, stroking of the brake pedal 12 is permitted, and pseudo pedal reaction force is produced and is applied to the brake pedal 12. As a result, brake feeling without causing the driver to feel strangeness is obtained.

In such a system condition, when the unillustrated control means detects depression given by the driver to the brake pedal 12, the electric motor 72 of the motor cylinder device 16 is actuated to push the actuator mechanism 74, and the first sleeve piston 88a and the second sleeve piston 88b are displaced in the direction of the arrow X1 in FIG. 1 against spring forces of the first return spring 96a and the second return spring 96b. The displacement of the first slave piston 88a and the second slave piston 88b pressurizes brake fluid pressure in the first fluid pressure chamber 98a and the second fluid pressure chamber 98b in a balanced manner, and thus desired brake fluid pressure is produced.

The brake fluid pressure in the first fluid pressure chamber 98a of this motor cylinder device 16 and the second fluid pressure chamber 98b thereof is transmitted to the wheel cylinders 32FR, 32RL, 32RR, 32FL of the disk brake mechanisms 30a to 30d via the first and second in-valves 120, 124 of the VSA device 18 which are in the opened conditions. By actuating the wheel cylinders 32FR, 32RL, 32RR, 32FL, desired braking force is applied to the respective wheels.

In other words, activated in the vehicle braking system 10 according to this embodiment in a normal condition in which, for example, the motor cylinder device 16 serving as a dynamic fluid pressure source and an unillustrated ECU performing by-wire control are operable is a so-called brake-by-wire brake system that actuates the disk brake mechanisms 30a to 30d with brake fluid pressure produced by the motor cylinder device 16 with the first cut-off valve 60a and the second cut-off valve 60b blocking communications between the master cylinder 34 that produces brake fluid pressure when the driver depresses the brake pedal 12 and the disk brake mechanisms 30a to 30d (wheel cylinders 32FR, 32RL, 32RR, 32FL) that brake the respective wheels. Hence, according to this embodiment, the present invention can be applied suitably to vehicles like an electric vehicle having no negative pressure by an internal combustion engine conventionally used.

Conversely, activated in an abnormal condition in that the motor cylinder device 16 becomes inoperable is a so-called conventional hydraulic brake system that actuates the disk brake mechanisms 30a to 30d (wheel cylinders 32FR, 32RL, 32RR, 32FL) by transmitting brake fluid pressure produced by the master cylinder 34 to the disk brake mechanisms 30a to 30d (wheel cylinders 32FR, 32RL, 32RR, and 32FL) with the first cut-off valve 60a and the second cut-off valve 60b being in the opened conditions, respectively, and the third cut-off valve 62 being in the closed condition.

Figure 7:
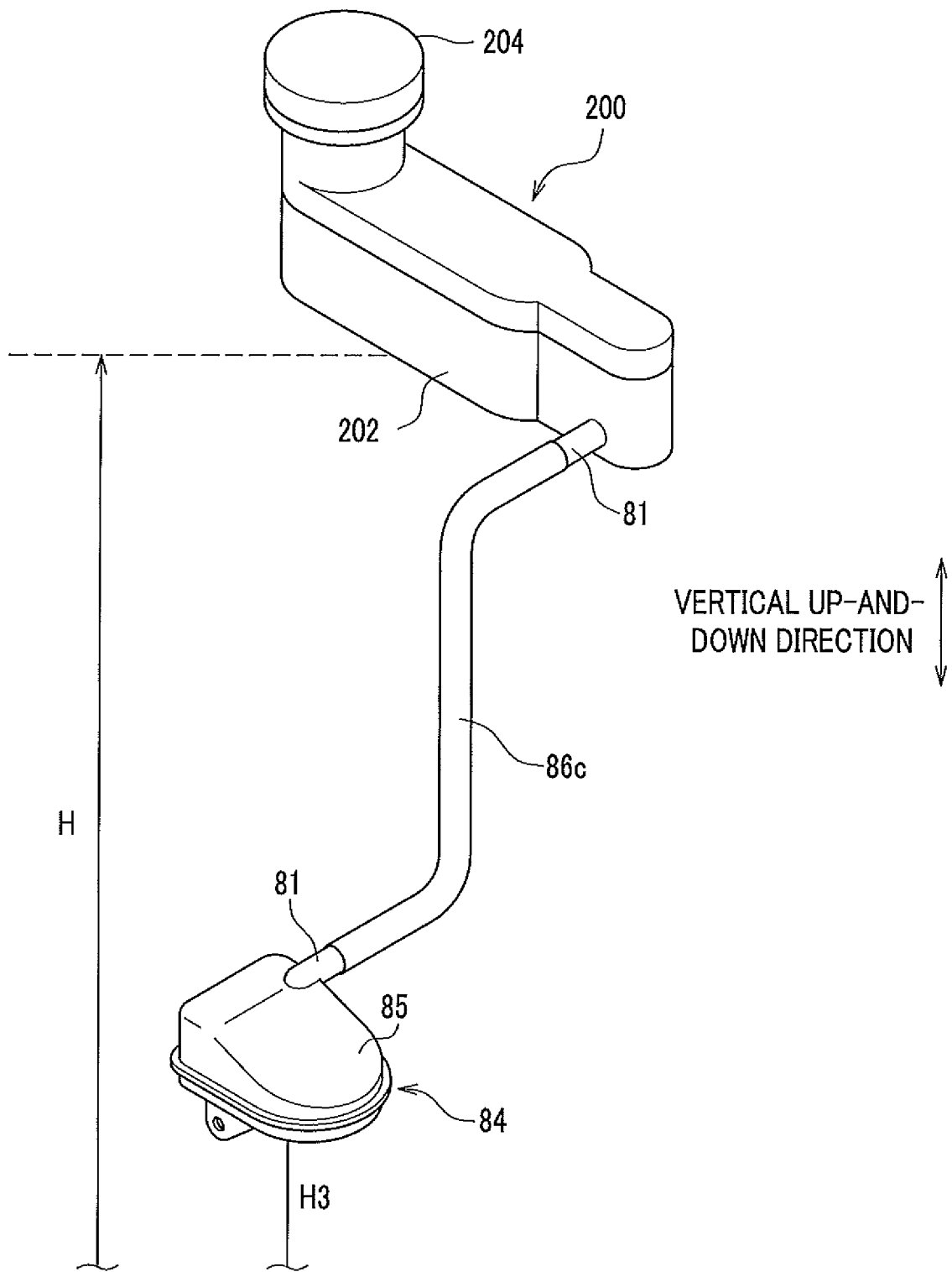
FIG. 7 is a perspective view illustrating a relationship of piping connection between an integrated reservoir and the second reservoir.

In this embodiment, as a reservoir structure, the main reservoir 37 fixed to the vehicle body frame, the first reservoir 36 attached to the input device 14, and the second reservoir 84 attached to the motor cylinder device 16 are structured as respective separate components, but the present invention is not limited to this structure, and for example, as illustrated in FIG. 7, an integrated reservoir 200 may be formed which have the first reservoir 36 and the main reservoir 37 integrated with each other, and this integrated reservoir 200 may be attached to the input device 14. This integrated reservoir 200 serves as a "first reservoir".

FIG. 7 is a perspective view illustrating a relationship of piping connection between the integrated reservoir and the second reservoir.

This integrated reservoir 200 includes, as illustrated in FIG. 7, a reservoir main body 202 formed so as to be relatively elongated along the axial direction, and a cap member 204 which is provided on the top face of the reservoir main body 202 and which closes an opening. In this case, the integrated reservoir 200 is connected to the second reservoir 84 attached to the motor cylinder device 16 via a piping tube 86c, and brake fluid reserved in the integrated reservoir 200 is supplied to the interior of the second reservoir 84 through the piping tube 86c.

Moreover, it is appropriate if a capacity (volume) A of the brake fluid reserved in a reservoir chamber of the integrated reservoir 200 be set to be larger than a capacity (volume) B of the brake fluid reserved in a reservoir chamber of the second reservoir 84 (A>B). As a result, the interior of the master cylinder 34 and the interior of the second reservoir 84 can be respectively refilled (compensated) with the brake fluid in the integrated reservoir 200, and thus necessary and sufficient amount of brake fluid in the master cylinder 34 and the cylinder main body 82 can be ensured.

Furthermore, a height position H of the integrated reservoir 200 attached to the input device 14 is, in comparison with a height position H3 of the second reservoir 84 attached to the cylinder main body 82 (motor cylinder device 16), set to be a higher position in the vertical up-and-down direction (H>H3). This setting is made in consideration of a fluid flow when the brake fluid is filled, and the brake fluid which is supplied through the opening of the integrated reservoir 200 can be filled in the second reservoir 84 through the piping tube 86c due to the own weight of the brake fluid.

According to this embodiment, since the second reservoir 84 is attached directly to the cylinder main body 82 of the motor cylinder device 16, downsizing of the whole device can be accomplished. Moreover, since the second reservoir 84 is provided to the motor cylinder device 16 itself which produces brake fluid pressure based on electric signals in accordance with at least brake operation, necessary and sufficient brake fluid in the cylinder main body 82 can be ensured, and thus a general versatility can be improved.

Moreover, according to this embodiment, the main reservoir 37 attached to the vehicle body frame, the first reservoir 36 attached to the input device 14 and connected to the main reservoir 37 via the piping tube 86a, and the second reservoir 84 which is connected to the main reservoir 37 via another piping tube 86b and which is provided at the motor cylinder device 16 are eliminated. Accordingly, necessary and sufficient brake fluid in the input device 14 and the motor cylinder device 16 can be surely ensured.

In this case, since the second reservoir 84 is, as illustrated in FIG. 2, disposed below the main reservoir 37 in the vertical up-and-down direction, brake fluid supplied to the main reservoir 37 can be filled smoothly in the second reservoir 84 due to the own weight of the brake fluid.

Furthermore, as illustrated in FIG. 7, since the integrated reservoir 200 having the first input reservoir 36 that is attached to the input device 14, and the main reservoir 37 integrated with each other is attached to the input device 14, and the second reservoir 84 provided at the motor cylinder device 16 is connected to the integrated reservoir 200 via the piping tube 86c, the number of components can be reduced.

In this case, since the second reservoir 84 is, in the vertical up-and-down direction, disposed below the integrated reservoir 200, brake fluid supplied to the integrated reservoir 200 can be filled smoothly in the second reservoir 84 due to the own weight of the brake fluid. It is appropriate if the volume of the brake fluid reserved in the integrated reservoir 200 to be set to be larger than the volume of the brake fluid reserved in the second reservoir 94.

Still further, according to this embodiment, as illustrated in FIG. 5, the electric motor 72 is attached to the cylinder main body 82, and the second reservoir 84 in communication with the interior of the cylinder main body 82 via the reservoir ports 92a, 92b is formed so as to protrude in an opposite side to the electric motor 72 with reference to the reservoir ports 92a, 92b. Accordingly, a special efficiency can be improved, thereby accomplishing the downsizing of the whole device.

Yet further, according to this embodiment, as illustrated in FIG. 6, provided in the reservoir main body 85 of the second reservoir 84 are the connection ports 101 that are to be connected to the reservoir ports 92a, 92b provided in the cylinder main body 82, and these connection ports 101 of the second reservoir 84 are connected to the reservoir ports 92a, 92b from the side where the electric motor 72 is disposed. Accordingly, communication of the second reservoir 84 with the motor cylinder device 16 is facilitated.

According to this embodiment, the vehicle brake system 10 provided with the motor cylinder device 16 which is capable of downsizing the whole device to improve a general versatility can be obtained.

DESCRIPTION OF REFERENCE NUMERALS

- 10 Vehicle brake system
- 14 Input device
- 16 Motor cylinder device (Electric brake actuator)
- 34 Master cylinder
- 36 First reservoir
- 37 Main reservoir
- 72 Electric motor
- 82 Cylinder main body (Electric brake actuator main body)
- 84 Second reservoir
- 86a to 86c Piping tube (Piping)
- 92a, 92b Reservoir port
- 101 Connecting port
- 200 Integrated reservoir (First reservoir)

The invention claimed is:

1. A vehicle brake-by-wire system, comprising:
    an input device that comprises a master cylinder into which a brake operation given by an operator is input, and a first reservoir which reserves a brake fluid in the master cylinder; and
    an electric brake actuator which produces brake fluid pressure using a brake fluid reserved in a second reservoir separate from the first reservoir, based on an electric signal generated in accordance with at least the brake operation, the electric brake actuator including a substantially cylindrical main body having a hollow interior bore formed therein, an electric motor, and an actuator mechanism interconnecting the electric motor and the main body,
    wherein:
    the second reservoir has two spaced-apart attachment flanges extending downwardly thereon, each of the attachment flanges having a mounting hole formed therein, and the second reservoir is disposed above the main body of the electric brake actuator,
    the electric motor includes a portion which extends above the main body of the electric brake actuator adjacent to the second reservoir,
    the main body of the electric brake actuator includes a projecting part that projects upwardly and has two cylindrical openings formed therein and communicating with the interior bore, the projecting part also having a pin-receiving hole formed therein to receive a locking pin, the pin-receiving hole extending in a direction substantially transverse to the cylindrical openings,
    a pair of ring-shaped seal members are provided in the openings of the projecting portion,
    the electric brake actuator has a locking pin inserted in the mounting holes of the attachment flanges and also through the pin-receiving hole formed in the projecting part, the locking pin positioning the second reservoir in a position to maintain the ring-shaped seal members in a compressed state, and
    the second reservoir, in communication with the interior bore of the electric brake actuator main body via a reservoir port, is disposed on the main body so as to protrude toward an opposite side of the main body relative to the electric motor.

2. The vehicle brake-by-wire system according to claim 1, further comprising a main reservoir which is attached to a vehicle body frame and which is connected with the first reservoir attached to the input device via a piping,
    wherein the second reservoir provided on the electric brake actuator main body is connected to the main reservoir via another piping.

3. The vehicle brake-by-wire system-according to claim 2, wherein the second reservoir is disposed below the main reservoir in a vertical up-and-down direction.

4. The vehicle brake-by-wire system-according to claim 1, wherein the second reservoir provided on the electric brake actuator main body is further connected to the first reservoir via an other piping.

5. The vehicle brake-by-wire system-according to claim 4, wherein the second reservoir is disposed below the first reservoir in a vertical up-and-down direction.

6. The vehicle brake-by-wire system-according to claim 1, wherein the second reservoir is provided with a connection port connected with the reservoir port provided in the electric brake actuator main body,
    and wherein the connection port of the second reservoir is connected to the reservoir port of the electric brake actuator main body from a side reservoir proximate the electric motor.

7. The vehicle brake-by-wire system-according to claim 4, wherein a volume of the brake fluid reserved in the first reservoir is set to be larger than a volume of the brake fluid reserved in the second reservoir.

8. A vehicle brake-by-wire system comprising:
    an input device into which a brake operation given by an operator is input; and
    an electric brake actuator which produces brake fluid pressure based on an electric signal generated in accordance with at least the brake operation, the electric brake actuator including a substantially cylindrical main body having a hollow interior bore formed therein, a hydraulic fluid reservoir disposed above main body of the electric brake actuator, an electric motor, and an actuator mechanism interconnecting the electric motor and the main body,
    wherein:
    the electric motor includes a portion which extends above the main body of the electric brake actuator adjacent to the reservoir,
    the main body of the electric brake actuator includes a projecting part that projects upwardly and has two cylindrical openings formed therein and communicating with the interior bore via reservoir ports, the projecting part also having a pin-receiving hole formed therein to receive a locking pin, the pin-receiving hole extending in a direction substantially transverse to the cylindrical openings, a pair of ring-shaped seal members are provided in the openings of the projecting portion, the electric brake actuator further comprising a locking pin inserted in the mounting holes of the attachment flanges and also through the pin-receiving hole formed in the projecting part, the locking pin positioning the second reservoir in a position to maintain the ring-shaped seal members in a compressed state, and the reservoir, in communication with the interior bore of the electric brake actuator main body via the reservoir ports, is disposed on the main body so as to protrude toward an opposite side of the main body relative to the electric motor.

* * * * *